United States Patent
Fu et al.

(10) Patent No.: US 10,334,209 B2
(45) Date of Patent: Jun. 25, 2019

(54) IMAGE STITCHING FOR FOOTWEAR COMPONENT PROCESSING

(71) Applicant: NIKE, Inc., Beaverton, OR (US)

(72) Inventors: Howard Fu, Taichung (TW); Guo-Chang Wang, Taichung (TW); Sunye Lee, Busan (KR)

(73) Assignee: NIKE, Inc., Beaverton, OR (US)

(*) Notice: Subject to any disclaimer, the term of this patent is extended or adjusted under 35 U.S.C. 154(b) by 118 days.

(21) Appl. No.: 15/380,861

(22) Filed: Dec. 15, 2016

(65) Prior Publication Data

US 2017/0178379 A1 Jun. 22, 2017

Related U.S. Application Data

(60) Provisional application No. 62/268,804, filed on Dec. 17, 2015.

(51) Int. Cl.
H04N 7/18 (2006.01)
G06T 3/40 (2006.01)
G06Q 10/04 (2012.01)
G06T 7/80 (2017.01)
B29D 35/00 (2010.01)
(Continued)

(52) U.S. Cl.
CPC ............ H04N 7/181 (2013.01); A43B 9/00 (2013.01); B29D 35/00 (2013.01); D05C 5/02 (2013.01); G06Q 10/043 (2013.01); G06T 3/4038 (2013.01); G06T 7/80 (2017.01); G06T 11/60 (2013.01); A43D 2200/60 (2013.01); G06T 2207/10016 (2013.01)

(58) Field of Classification Search
None
See application file for complete search history.

(56) References Cited

U.S. PATENT DOCUMENTS 5,172,326 A    12/1992  Campbell, Jr. et al.
6,704,460 B1 *  3/2004  Pitruzzello .......... G06K 9/0063
                                                           382/284
(Continued)

FOREIGN PATENT DOCUMENTS

CN    203317799 U    12/2013
CN    104168414 A    11/2014
(Continued)

OTHER PUBLICATIONS

International Search Report and Written Opinion dated Aug. 14, 2017 in International Patent Application No. PCT/US2016/067218, 18 pages.

Primary Examiner — Mark T Monk
(74) Attorney, Agent, or Firm — Shook, Hardy & Bacon L.L.P.

(57) ABSTRACT

A multiple camera vision system captures discrete images having overlapping fields of view. Each of the cameras is calibrated and the images from the cameras are stitched together as a stitched image. A stitched image from the multiple cameras is then used in a calibration process to prepare the multiple camera vision system to be used in connection with a processing operation. A stitched image is used as an input for identifying a feature of the material and for determining a tool path for the material. The tool path determined with the stitched image is provided to a process station to perform an operation on the material.

20 Claims, 5 Drawing Sheets

(51) Int. Cl.
*D05C 5/02* (2006.01)
*G06T 11/60* (2006.01)
*A43B 9/00* (2006.01)

(56) References Cited

U.S. PATENT DOCUMENTS

| | | | |
|---|---|---|---|
| 8,866,913 B1 * | 10/2014 | Hsieh | H04N 17/002 348/153 |
| 2011/0157373 A1 | 6/2011 | Ye et al. | |
| 2015/0107033 A1 | 4/2015 | Chang et al. | |

FOREIGN PATENT DOCUMENTS

| | | | |
|---|---|---|---|
| EP | 1788345 A1 | 5/2007 | |
| TW | M544407 U | 7/2017 | |

* cited by examiner

IMAGE STITCHING FOR FOOTWEAR COMPONENT PROCESSING

CROSS-REFERENCE TO RELATED APPLICATIONS

This application having serial number 15/380,861 and entitled "Image Stitching for Footwear Component Processing" claims the benefit of U.S. Provisional Application No. 62/268,804, entitled "Image Stitching for Footwear Component Processing," and filed Dec. 17, 2015, the entirety of which is incorporated by reference herein.

TECHNICAL FIELD

Aspects provide methods and systems for using a multiple camera vision system to stitch discrete images together for use with a manufacturing process.

BACKGROUND

Vision systems capture a discrete image that can be used to identify a part and to perform a process based on the image. A vision system may have a limited field of view that does not cover an intended area. To increase the field of view, the image capture device may be moved farther from the target area to increase the field of view at the expense of resolution. Alternatively, a wide-angle lens may be used with the image capture device to increase the field of view; however, the wide-angle lens may distort an image captured and limit the usability of the captured image for subsequent manufacturing processes.

BRIEF SUMMARY

Aspects hereof provide systems and methods for stitching discrete images captured by a vision system for use in subsequent manufacturing processes. An image stitching and manufacturing system may comprise a conveyance system that moves a material in a process direction of the system. The system also includes a plurality of cameras. A first camera of the plurality of cameras has a first field of view ("FOV") including an area relative to the conveyance system that overlaps a portion of a second FOV of a second camera of the plurality of cameras. The system also comprises a process station that is after the plurality of cameras in the process direction (e.g., the direction of material movement) of the conveyance system. Additionally, the system includes a computing device that is logically coupled with the plurality of cameras to receive a first image from the first camera having the first FOV and a second image from the second camera having the second FOV. The computing device stitches the first image and the second image to form a stitched image that serves as an input for the computing device to provide instructions to the process station.

With the system, an image stitching and manufacturing method is available that includes capturing a first image with a first camera of a first material portion of a material and capturing a second image with a second camera of a second material portion of the material. The first material portion and the second material portion include a first common portion of the material. The method also comprises stitching the first image and the second image as a stitched image and identifying a first pattern in the stitched image. From the stitched image, the method includes determining a first tool path based on the identified first pattern. The method in this example also includes instructing a process station to perform an operation on the material based on the first tool path.

This summary is provided to enlighten and not limit the scope of methods and systems provided hereafter in complete detail.

DESCRIPTION OF THE DRAWINGS

The present invention is described in detail herein with reference to the attached drawing figures, wherein.

DETAILED DESCRIPTION

Figure 1:
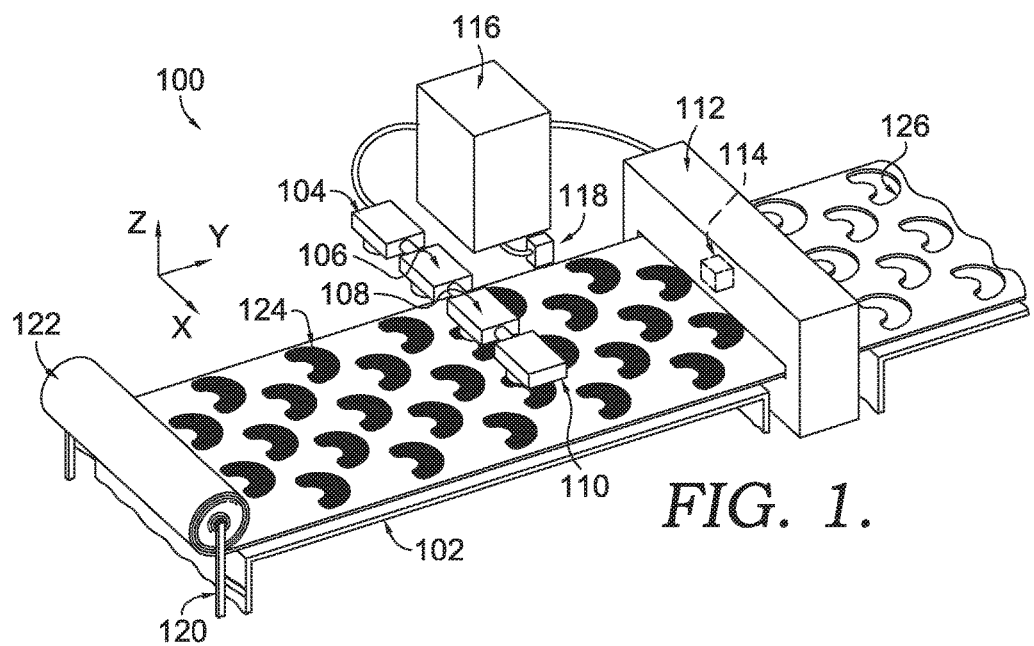
FIG. 1 depicts an exemplary image stitching and manufacturing system, in accordance with aspects hereof.

Aspects hereof provide systems and methods for stitching images together of a material to be processed by a processing system. Image stitching is a merging of discrete images into a unitary stitched image. By merging discrete images into a unitary stitched image, a larger field of view ("FOV") may be captured by the collection of imaging devices (e.g., cameras) at a higher resolution than a single imaging device is able to capture with a similar physical configuration. For example, a single imaging device, such as a camera, may have a similar FOV as a plurality of cameras by being positioned a sufficient distance from a target area to encompass an intended FOV; however, the increase in distance to achieve the intended FOV by the single camera system reduces a resolution of the captured image as compared to the multiple camera configuration. Additionally, a single imaging device may be modified with a varied lens configuration, such as a wide-angle lens (e.g., a fisheye lens), that is capable of capturing the intended FOV without requiring the additional offset distance discussed supra. However, modification of the lens structure can introduce significant and difficult to compensate for distortion of the resulting image. Therefore, in applications where the image is intended to be used in connection with a vision system for part identification, quality control, positional information, process operations, and the like, the distortions may not be suitable. Therefore, aspects hereof contemplate providing a plurality of cameras that each capture a different FOV in respective images at a simultaneous capture period that are then able to be stitched together as a single image. This image stitching solution provides an intended FOV image capture without the distortion of a wide-angle lens and without the increased distance offset for a single imaging device to capture the same FOV. Further, a higher resolution of the intended FOV can be achieved with the plurality of cameras as opposed to a single camera capturing the same intended FOV. Additionally, traditional image capture devices may be implemented when used in the image stitching configuration without compensating for the shortcomings of a single camera through specialized equipment for a single camera solution.

As such, the image stitching and manufacturing system digitally stitches a plurality of images together to form a stitched image that is then used within a vision system to identify one or more features in a material captured in the stitched image. The features are identified from a library of potential features, in an exemplary aspect. Once a feature is identified, a set of instructions are retrieved and/or determined to perform an operation on the material. The set of instruction may be a tool path for a process station. For example, a process station may be an adhesive application device for applying an adhesive to the material, a painting device for applying a surface treatment to the material, a pickup tool for moving a portion of the material, a pressing device for compressing one or more materials, a heating device for applying thermal energy to the material, a sewing device for stitching the material with one or more materials, a welding device for bonding the material with one or more materials, and other processes contemplated herein.

The set of instructions may be a tool path understood by the process station. For example, it is contemplated that a tool path may be a numerical control instructions commonly interpreted by processes stations for controlling motion and activity. The tool path may be pulled from a digital library based on an identified feature. Alternatively, the tool path may be generated in response to the identified feature. In response to the set of instructions being provided to the processing station, the processing station may then perform a manufacturing process on the material in compliance with the received instructions.

In an exemplary aspect, the material captured by the plurality of cameras is a rolled good having a plurality of footwear components integrally formed therein. As the continuous roll of material progresses through the collective FOV of the plurality of cameras, image stitching is performed to result in a unitary image of the roll width of the material. The stitched image captures one or more of the integrally formed footwear components in the material that are then identified by a computing device. The computing device then determines, either from a library or it generates instructions for use by a laser cutting device that is a process station. As the rolled material progresses from the plurality of cameras and into the laser cutter, the laser cutter cuts the material to extract the identified components from the material. Therefore, a continuous roll of material may pass through the system where the material includes components that are identifiable and able to be extracted therefrom in a continuous process.

As will be provided hereafter, the image stitching process includes an initial calibration of the multiple image-capture devices as well as a calibration based on the resulting stitched image to be used in a vision system for identification of features/components. Each camera is initially calibrated to achieve a consistent pixel per inch among the cameras. The plurality of cameras then each simultaneously captures an image of an area that includes one or more features. Overlap portions between the respective images are identified and registered to coordinate the discrete images as a single view. This coordinating and registration allows the discrete images from the plurality of cameras to be stitched together as a unitary image. The vision system having the plurality of cameras is then calibrated based on a stitched image.

In an exemplary aspect, an image stitching and manufacturing system comprises a conveyance system that moves a material in a process direction. The system is also comprised of a plurality of cameras, wherein a first camera of the plurality of cameras has a first FOV including an area relative to the conveyance system that overlaps a portion of a second FOV of a second camera of the plurality of cameras. It is understood that any number of cameras may be implemented, such as four. The system also includes a process station that is after the plurality of cameras in the process direction of the conveyance system. Further yet, the system includes a computing device that is logically coupled with the plurality of cameras to receive a first image from the first camera having the first FOV and a second image from the second camera having the second FOV. The computing device stitches the first image and the second image to form a stitched image that is an input for the computing device to provide instructions to the process station.

Another aspect contemplates an image stitching and manufacturing method that includes capturing a first image with a first camera of a first material portion of a material. The method continues with capturing a second image with a second camera of a second material portion of the material. The first material portion and the second material portion include a first common portion of the material. The method continues with stitching the first image and the second image as a stitched image and then identifying a first pattern in the stitched image. From the stitched image the system determines a first tool path based on the identified first pattern. Further, the method includes instructing a process station to perform an operation on the material based on the first tool path.

Aspects contemplated herein also include a calibration method of a vision system for using image stitching with a manufacturing process. The method includes calibrating a first camera having a first FOV from the vision system and calibrating a second camera having a second FOV from the vision system. The first FOV and the second FOV include a common area, which may be referred to as an overlap area herein. The method continues with capturing a first image from the first camera and capturing a second image from the second camera. The method then identifies a consensus feature in the first image and the second image. The consensus feature is a feature found in both images. The method continues with adjusting an offset of the first camera and the second camera based on the identified consensus feature. From there, the method allows for the generating a first stitched image from the first camera and the second camera after adjusting the offset and then calibrating the vision system based on the first stitched image.

Turning to FIG. 1 that depicts a system 100 having a conveyance system 102, a plurality of cameras 104, 106, 108, 110, a process station 112, and a computing device 116. The system 100 is exemplary in nature and not limiting. It is contemplated that additional or fewer elements may be incorporated with a system in accordance with aspects hereof. For example, any number of cameras may form a plurality of cameras (e.g., 2, 3, 4, 5, 6, 7, 8, 9, and 10). Further, it is contemplated that any number of process stations 112 may be implemented in exemplary aspects. Further, alternative elements/devices/components not depicted may also be incorporated in exemplary aspects.

The conveyance system 102 may be any structure capable of moving material past the plurality of cameras. In an exemplary aspect, the conveyance system 102 is a conveyor style mechanism that is effective to transport a rolled material 122 along a substantially flat surface toward the process station 112. The conveyance system 102 may be comprised of a belt, a positive-pressure table, a vacuum table, a caster table, and the like. It is contemplated that the material moved on the conveyance system may be moved by any means. For example, the conveyance system may have a rotating belt on which the material is positioned, one or more gripping elements may mechanically secure the material and move the material, one or more pushing elements may push the material, and/or one or more pulling elements may pull the material. For example, it is contemplated that the material may be a rolled good, such as the material 122, that moves along a rotating conveyor-like mechanism on the conveyance system 102 as the rolled good is unrolled and is processed. The conveyance system 102 is effective to move the material past the plurality of cameras 104, 106, 108, 110 to the process station 112, in the depicted example of FIG. 1. Additionally, it is contemplated that the material may station stationary as the plurality of cameras and then the processing station are moved into a position relative to the material, in another exemplary aspect.

The system 100 may also be comprised of a rolled material holder 120. The rolled material holder 120 may be effective to unroll the material 122 for feeding to the conveyance system 102. For example, the rolled material holder 120 may have a stepper motor or other controlled movement mechanisms capable of adjusting an amount of material unrolled in a given time. This controlled and mechanized distribution of the rolled material 122 may be effective to feed the material at a known rate through the system 100.

The system 100 may also include a position register 118. The position register tracks the position of the material as it extends through the system 100. For example, as a portion of the material 122 is captured in the collective FOV of the plurality of cameras 104, 106, 108, 110, the position register 118 communicates and coordinates with the computing device 116 and the process station 112 the location of the one or more identified features to which an operation may be performed by the process station 112. Therefore, instead of capturing an image at the processes station and then performing a batch processes to allow the vision system to identify a feature, the system 100 is able, in exemplary aspects, to continuously process material with the plurality of cameras 104, 106, 108, 110 and the process station 112. Further, it is contemplated in alternative aspects that the processing of the material 122 is still done in a batch manner, but the plurality of cameras 104, 106, 108, 110 can be removed from the process station 112 environment, which may limit maintenance and contamination of the plurality of cameras 104, 106, 108, 110 by debris formed at the process station 112, in an exemplary aspect.

The position register 118 may be a mechanical position sensor, a vision sensor, a light tracking device, and the like to monitor the position of the material as it progresses through the system 100. While the position register is depicted as a box between the plurality of cameras 104, 106, 108, 110 and the process station 112, it is understood that it may be positioned at any location in the system 100, such as above or below the conveyance system 100, before or after the process station 112, in conjunction with the rolled material holder 120, and the like.

The plurality of cameras 104, 106, 108, 110 may be any image capture device. For example, they may operate in the visible light spectrum, the infrared light spectrum, the ultraviolet light spectrum, or a combination thereof. Further, the plurality of cameras 104, 106, 108, 110 may be video cameras capturing a series of images or they may be discrete image capture. The cameras may use a charged coupled device (CCD) or a complementary metal-oxide-semiconductor (CMOS) sensor. The plurality of cameras 104, 106, 108, 110 are coupled with the computing device 116 logically so that information may be communicated there between. For example, digital image data may be sent from plurality of cameras 104, 106, 108, 110 to the computing device 116 and instructions to capture or otherwise adjust characteristics of the image capture may be received from the computing device 116, in exemplary aspects.

The computing device 116 has a processor and memory. The computing device 116 may include a variety of computer-readable media. Computer-readable media can be any available media that can be accessed by computing device 116 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data.

Computer storage media includes non-transitory RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

The computing device 116 may include computer-readable media having instruction embodied thereon that are effective to cause one or more elements of the system 100 to perform one or more actions. For example, the instructions may cause a movement mechanism to move, a laser to emit laser energy, a camera to capture an image, a register to register a position of the material, and a processes station to perform an operation, in an exemplary aspect.

The process station 112 receives instructions from the computing device 116 and performs and operation on the material 122 in response to those instructions. The process station 112 may apply adhesive, apply a surface finish (e.g., colorant, water repellant material, water absorbent material), pick up and move the material, press the material (e.g., hot press, cold press, steam press), heat the material (e.g., dry, cure, heat), sew the material, and/or weld the material in exemplary aspects. In a specific example, the process station 112 is a laser cutting/trimming device that is effective to apply laser energy to the material 122 to form one or more cuts there through.

In the depicted example of FIG. 1, the material 122 is comprised of a plurality of footwear components, such as a shoe upper element 124. The plurality of footwear components may be integrally formed in the material, such as a printed pattern, integrally knitted elements, integrally woven elements, and the like. As such, as the material passes under the collective FOV of the plurality of cameras 104, 106, 108, 110, the type of components within the material 122 are identified and an appropriate tool path is provided to the processes station. Upon receiving the tool path information and the appropriate portion of the material 122 also arriving at the process station 112, the process station 112 performs an operation, such as activating a tool 114 and controlling the position of the tool 114 to complete the operation. In the depicted example, the tool 114 may be a laser that emits laser energy at the material 122 to cut out the plurality of footwear components from the material 122 resulting in the material 122 having cut-out portions 126, in the depicted example of FIG. 1.

Figure 2:
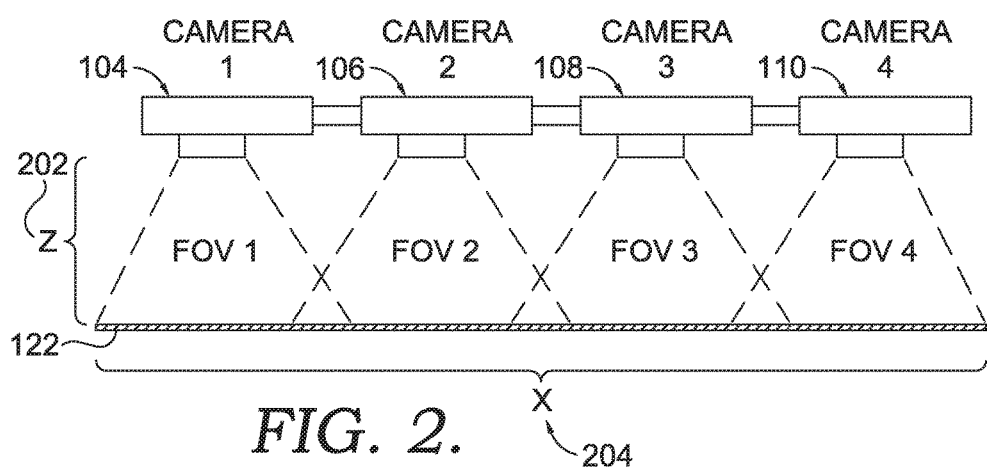
FIG. 2 depicts a profile view of the plurality of cameras of FIG. 1 having overlapping fields of views, in accordance with aspects hereof.
Figure 6:
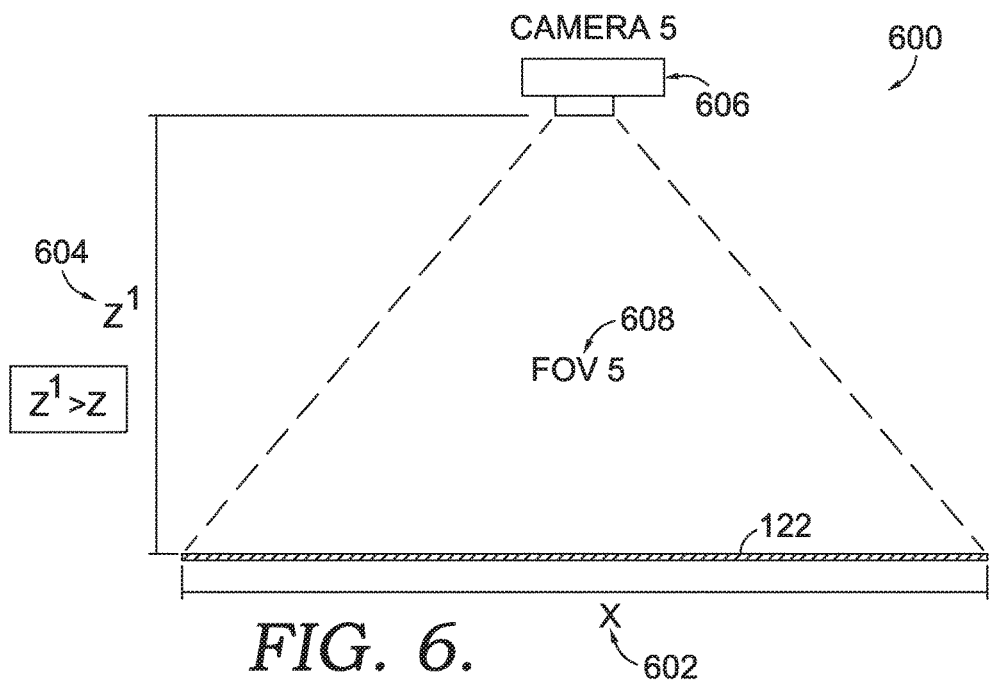
FIG. 6 depicts a non-stitched image capture configuration having a single camera capturing the same roll width of the material as that of FIG. 2.

FIG. 2 depicts a profile view of the plurality of cameras 104, 106, 108, 110 having overlapping field of views, in accordance with aspects hereof. In this illustration, the FOVs cover a roll width 204 of the material 122 from FIG. 1. Because the plurality of cameras 104, 106, 108, 110 are used in combination to form a stitched image covering the roll width, a height offset Z in the Z axis is represented by numeral 202. In comparison, FIG. 6 depicts a non-stitched image capture configuration 600 having single camera 606 capturing the same roll width 602 of the material 122 in the FOV 608 as that of FIG. 2, in accordance with aspects hereof. However, the configuration 600 has a distance offset Z' 604 in the Z axis. In this example using a single camera to capture the roll width 602, Z' 604 is greater than Z 202 of FIG. 2. In a manufacturing situation, reducing the distance offset in the Z-direction allows for greater manufacturing setup flexibility and a smaller dedicated manufacturing volume requirement to achieve the goals. Further, for some roll widths, the distance offset in the Z direction may be so great that calibration and consistency are affected because of the distance maintained between the material 122 and the camera. As also previously discussed, the camera 606 may be more expensive than the plurality of cameras 104, 106, 108, 110 as the individual resolution captured by each of the plurality of cameras 104, 106, 108, 110 may be less than the single camera 606 of FIG. 6. Further, the camera 606 may be augmented with a wide-angle lens to reduce the Z axis distance while still capturing the roll width 602. A wide-angle lens may affect the image capture and calibration process to either insert inconsistencies and/or to slow down the image processing to compensate for the wide-angle lens distortion. Therefore, use of a single camera to capture the roll width 602 is not implemented in exemplary aspects.

Figure 4:
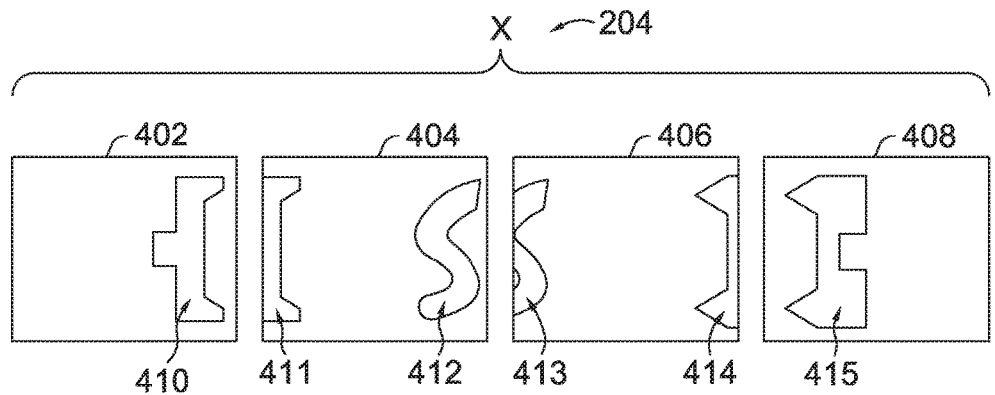
FIG. 4 depicts a series of discrete images captured having overlapping portions, in accordance with aspects hereof.

FIG. 4 depicts a series of discrete images captured having overlapping portions, in accordance with aspects hereof. The series of images includes images 402, 404, 406, and 408 that collective capture an area of material having the roll width 204 in the X axial direction. The image 402 is comprised with a feature 410. The image 404 is comprised with the features 411 and 412. The image 406 is comprised of the features 413 and 414. The image 408 is comprised of the feature 415.

The feature 410 includes at least a portion of the feature 411. The feature 412 includes at least a portion of the feature 413. The feature 414 includes at least a portion of the feature 415. The inclusion of common features between the discrete images is a result of FOV overlap between the cameras capturing the respective images. As better illustrated in FIG. 3, which depicts a series of FOVs and their respective overlapping areas along the roll width 204, in accordance with aspects hereof. A FOV 1 302, a FOV 2 304, a FOV 3 306, and a FOV 4 308 capture the roll width 204 of the exemplary material 122. As the material 122 moves in a process direction aligned with a Y axis 206 in this top-down perspective, the material 122 can be moved within the combined FOVs to capture the length of the material 122 while a plurality of cameras (e.g., plurality of cameras 104, 106, 108, 110 of FIGS. 1 and 2) capture the roll width 204 in the X axis direction.

Figure 3:
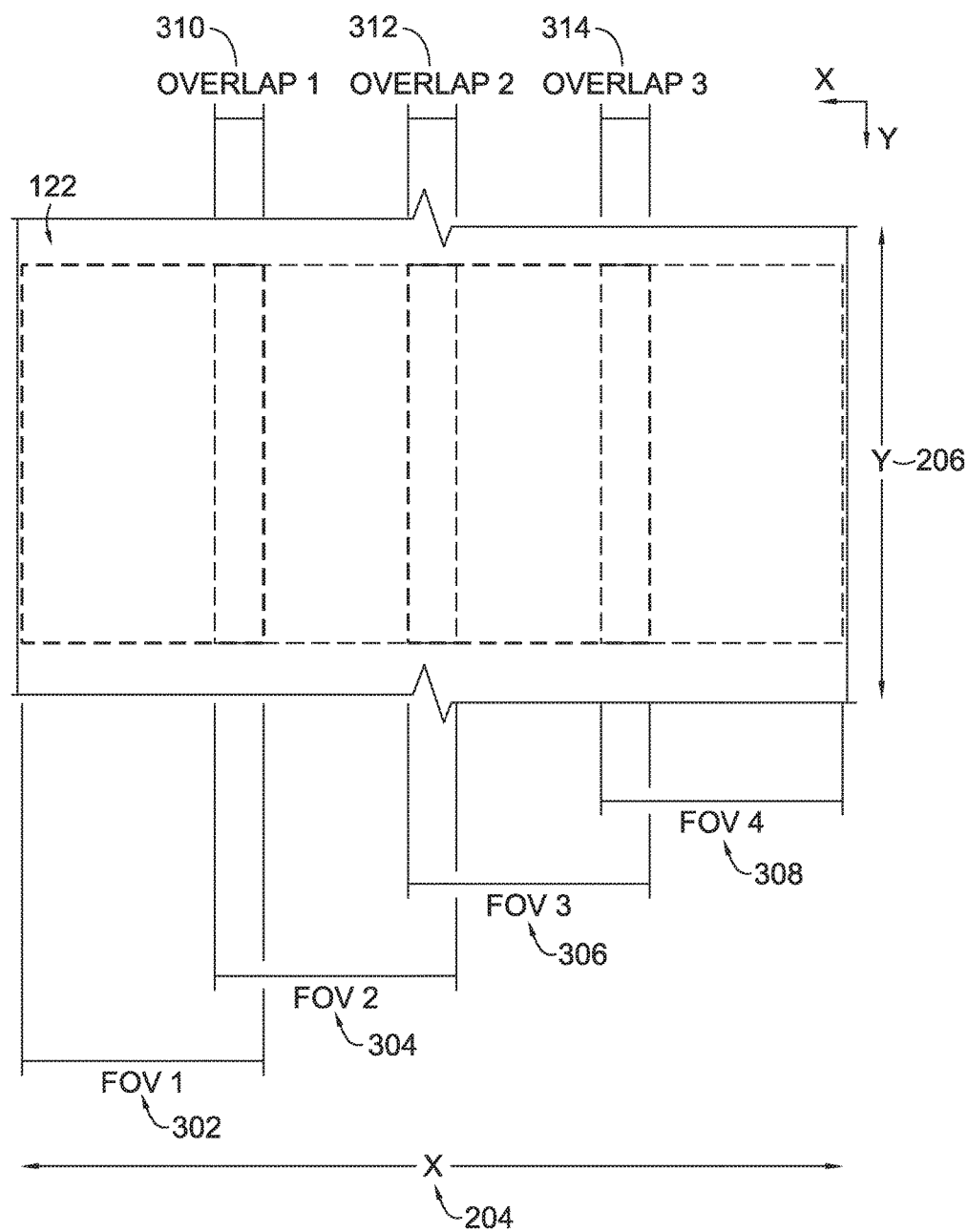
FIG. 3 depicts a series of field of views and their respective overlapping areas along a roll width, in accordance with aspects hereof.

As depicted in FIG. 3, the FOV 1 302 and the FOV 2 304 overlap each other to capture a common portion of the material 122. The overlap between the FOV 1 302 and the FOV 2 304 is an overlap 1 310. The overlap between the FOV 2 304 and the FOV 3 306 is an overlap 2 312. The overlap between the FOV 3 306 and the FOV 4 308 is an overlap 3 314.

Features of the material 122 that are present in the corresponding locations related to the exemplary overlaps provide features for calibrating the respective cameras. For example, it is contemplated that the feature 411 in FIG. 4 is within an overlap region (e.g., overlap 1 310) for both a first camera (e.g., camera 104 of FIG. 2) and a second camera (e.g., camera 106 of FIG. 2). As such, at least a portion of the feature 411 is captured in the image 402 as part of the feature 410 and in the image 404 as the feature 411 in FIG. 4. The overlap region having a consensus feature—a common feature found in discrete images—allows for the computing device to calibrate, align, orient, offset, and the like for generating a stitched image useable for manufacturing purposes.

Figure 5:
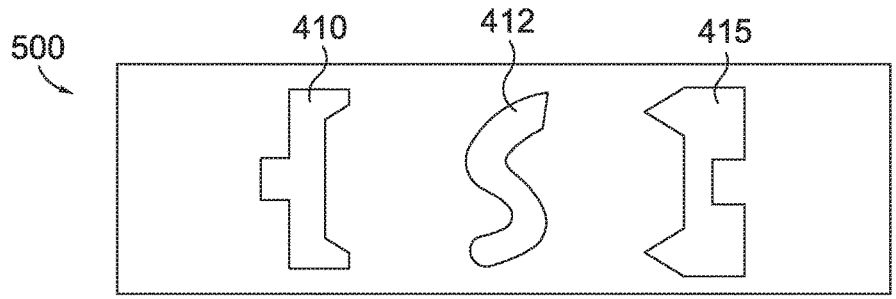
FIG. 5 depicts an exemplary stitched image based on the discrete images of FIG. 4, in accordance with aspects hereof.

After a computing system identifies consensus features between discrete images, the discrete images may be merged into a unitary image by an image stitching process. The computing device with instructions embodied on computer readable media is able to stitch a series of discrete images, such as images 402, 404, 406, and 408 into a unitary image, referred to as a stitched image, such as depicted in FIG. 5 as an image 500, in accordance with aspects hereof. The image 500 is the stitched version of the discrete images from FIG. 4. The image 500 is comprised of the feature 410, 412, and 415. The image 500, in this example, provides a roll width unitary image of a material (e.g., material 122 of FIG. 1) using multiple cameras to form the complete single image 500.

It is understood that the features may be of any size, shape, configuration, and construction. In an exemplary aspect, non-repeating features are implemented. In an alternative aspect, a repeating series of features are implemented, but the repeating series is greater than a FOV of a camera capturing the material. In another aspect, a common feature is present, but the feature is oriented and/or positioned in varied manners along the roll width. Additionally, it is contemplated that a common feature is replicated across the various FOVs. Additionally, it is contemplated that the feature is integral to the material, such as integrally woven, knitted, printed, or otherwise formed. It is also contemplated that the feature may be physically distinct from the material and/or the conveyance system corresponding to the captured FOVs. For example, one or more discrete elements (e.g., markers, cutouts, calibration materials) may be positioned, independently of a rolled good material and/or the conveyance system.

In an exemplary aspect, it is contemplated that the features are integrally woven or knit structures that form at least a portion of a footwear upper. For example, a flat loom may generate a rolled good having integrally formed components of a shoe upper therein. Each of the components formed in the rolled good from the loom may include functional and/or aesthetic elements for that shoe upper. One or more of these elements, alone or in combination, may serve as a feature for use by the cameras and computing device to stitch a unitary image from discrete images. In this example, the features, alone or in combination, may also be used to determine an appropriate tool path or to generate an appropriate tool path for the material associated with the features. The tool path, such as a laser cutting path for a laser cutter at the processing station, may cut the material to include or exclude one or more of the features of the shoe upper used to determine the tool path. Stated differently, the one or more features used for stitching an image may also be used for determining a toolpath. Alternatively, it is contemplated that one or more features used for stitching discrete images together, such as points of interest as referred to in the art, may be independent and distinct from features used to determine/generate a tool path for the material. Further yet, it is contemplated that the tool paths may be determined from one or more features included and/or excluded from a resulting part processed at the processing station.

The FIGS. 2, 3, and 4 depict exemplary image sizes and configurations as well as exemplary overlap sizes and configurations. It is understood that a discrete image may be of any size and configuration, an overlap may be of any size or configuration, a combination of images may be of any size or configuration, and a combination of images and overlaps may be any size or configuration. For example, it is contemplated that a first FOV from a first camera may be different than a second FOV from an adjacent second FOV. Therefore, an amount of overlap between the first FOV and the second FOV may be different than an amount of overlap of a third FOV by a third camera and a fourth FOV by a fourth camera, where the first, second, third, and fourth FOVs capture a common material simultaneously.

Figure 7:
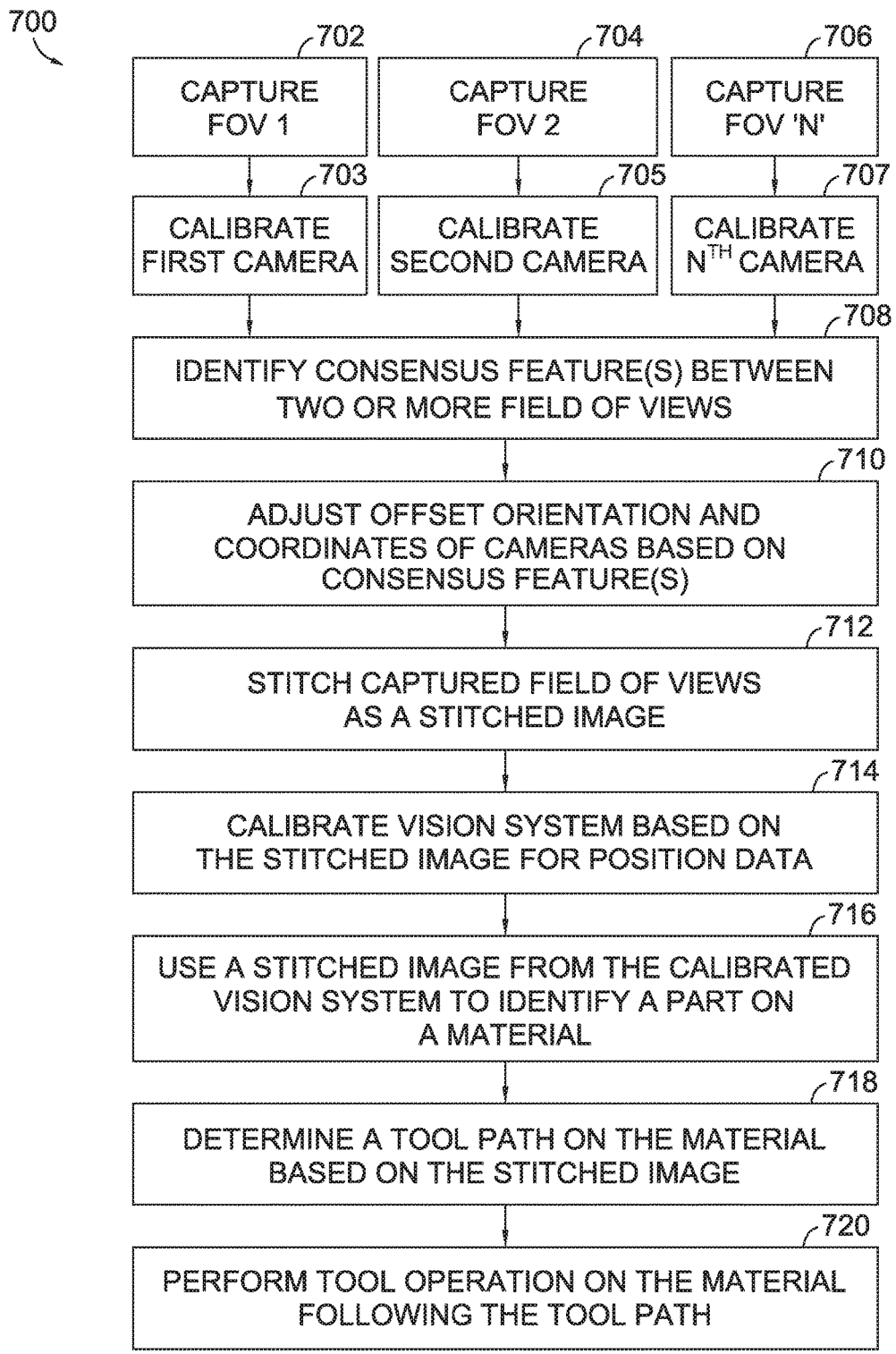
FIG. 7 depicts an exemplary block diagram representing a method for calibrating, images stitching, and manufacturing with a vision system, in accordance with aspects hereof.

FIG. 7 depicts an exemplary block diagram 700 representing a method for calibrating, images stitching, and manufacturing with a vision system, in accordance with aspects hereof. At a block 702, a first FOV is captured, such as by a first camera. At a block 703, the first camera is calibrated. For example, an image captured in the first FOV from block 702 may serve as an input for a calibration process of the first camera. The calibration may allow a computing device to calibrate the first camera to a known pixel per inch (or any measurement) that then allows the images captured by the first camera having the first FOV to be scaled up or down relative to other cameras. Similarly, at a block 704, a second FOV is captured, such as by a second camera. At a block 705, the second camera is calibrated. At a block 706, an $N^{th}$ FOV is captured, where "$N^{th}$" represents any number, such as, 1, 2, 3, 4, 5, 6, 7, 8, or 9. At a block 707, the $N^{th}$ camera is calibrated. Blocks 702-707 provide for an initials calibration of the cameras in a vision system, such as a calibration provided by manufacturers of vision components and systems. However, unlike traditional calibration systems that calibrate based on discrete images, the method of FIG. 7, as will be discussed in greater detail, provides at least a two-tiered calibration with a subsequent tier of calibration using a stitched image for the calibration input, in this exemplary aspect.

The first calibration of blocks 703, 705, and 707 may allow for a stitching process to occur by scaling each of the discrete images to a common scale that is effective for forming a stitched image. For example, a block 708 provides for an identification of consensus features between two or more of the field of views. The consensus features may be a point of interest or a series of points of interest (e.g., a series of pixels that are common between two discrete images) from the images captured with the respective FOVs. The identification may be performed by a computing device having instructions embodied on computer readable media that is effective to determine one or more consensus features in two or more images.

At a block 710, an adjustment of one or more images includes adjusting offset orientations and coordinates of the cameras based on the consensus features. For example, if the first FOV and the second FOV are slightly skewed from one another, one or more of the associated cameras may be digitally adjusted to compensate for the orientations and coordinate offset. Therefore, when data of the cameras are merged as a stitched image, a continuous and optically correct representation can be generated as the stitched image. As depicted in a block 712, a stitched image is formed by stitching captured FOVs. In an exemplary aspect, the same images captured in blocks 702, 704, and 706 are the images stitched. In an alternative exemplary aspect, different images captured from the calibrated cameras of blocks 703, 705, and 707 are stitched together. Further, it is contemplated that the calibration of blocks 703, 705, 707, once completed, is not performed again prior to each stitching operation. Instead, unless the cameras are mechanically moved or disturbed, the stitching process may proceed with the original individual camera calibration not being repeated, in an exemplary aspect.

The stitched image from block 712 is used as an input for a calibration process of the vision system. For example, while the discrete cameras are calibrated to facilitate an eventual stitching operation, this calibration using the stitched image allows for the stitched image to be used in the vision system for generation/determination of a tool path for a processing station. For example, the calibration of the stitched image at block 714 may allow for the stitched image to serve as an input from which numeric controlled instructions are determined. This calibration with the stitched image may determine if distortions exist in the stitched image and correct those distortions to make the stitched image suitable for use in determining a tool path. Further, it is contemplated that the calibration of the stitched image may identify and correct lapses that occurred in the discrete camera calibration process. Therefore, this secondary calibration using stitched image comprised of merged discrete images allows for a multiple camera vision system to be implemented in a manufacturing process, in an exemplary aspect. As stated previously, unlike a single discrete image that may have a lower resolution or distortions provided by wide-angle lens configuration, the multiple camera configuration allows for a smaller physical spatial volume, a higher resolution, and potentially a faster solution, in some aspects.

A block 716 provides using a stitched image from the calibrated vision system to identify a part on a material. For example, the vision system after calibrating based on a stitched image, may capture new images of a rolled good having integrally formed components for footwear. The vision system may capture a series of discrete, but simultaneous, images of the material. The discrete images may be stitched into a stitched image. The stitched image may then be processed by a computing device to identify one or more parts/components thereon. For example, points of interest may be detected in the stitched image that corresponds to one or more known features stored in a library. Based on the match of the points of interest with known parts in the library, the part/component may be determined and electronically positioned on the material. Alternatively, the stitched image may include one or more parts/components that are detected based on a logic rather than a stored library to which points of interest may be matched. Therefore, it is contemplated that a part can be identified from a stitched image in a number of manners. Additionally, as the components may be identified based on fine details of the material, the stitched image having a potentially greater resolution than a single discrete image covering the same collective FOV may be better suited, in exemplary aspects, to determine a feature/part.

At a block 718, a tool path is determined for the material based on the stitched image and the identified part. For example, a known set of operations by a process station may be stored with the computing system such that when that given part is identified, the tool path can be retrieved from memory. Additionally, it is contemplated that the tool path may be generated without retrieving a tool path based on the points of interest or features of the stitched image. Therefore, depending on the application and use, a tool path may be retrieved or created. The stitched image may provide inputs for modifying a retrieved tool path. For example, discrepancies between an ideal feature and the actual feature of the material may allow for a compensation of a retrieved tool path to account for the discrepancy. Additionally, position and orientation information of the feature may be accounted for to modify a tool path to be performed appropriately on the material, in an exemplary aspect.

At a block 720, an operation is performed on the material based on the tool path from block 718. For example, a process station may receive the tool path information in a useable format that causes the processes station to perform the operation on the material. Therefore, it is contemplated that the processes station in connection with a computing device registers the position of the material as it advances along the conveyance system to the process station. At an appropriate time and place relative to the material, the process is performed on the material. For example, the process may be a laser cutting operation that cuts one or more components for an article of footwear from the material. A tool path useable by the laser cutter may be provided by a computing device having a stitched image of the material as an input. The tool path instructs the laser cutter to cut the material in a defined pattern to result in a component be removed from the rolled good, in this example.

While a specific order is provided in FIG. 7, it is understood that the order may be adjusted, additional steps may be inserted, and depicted steps may be omitted, in exemplary aspect.

Figure 8:
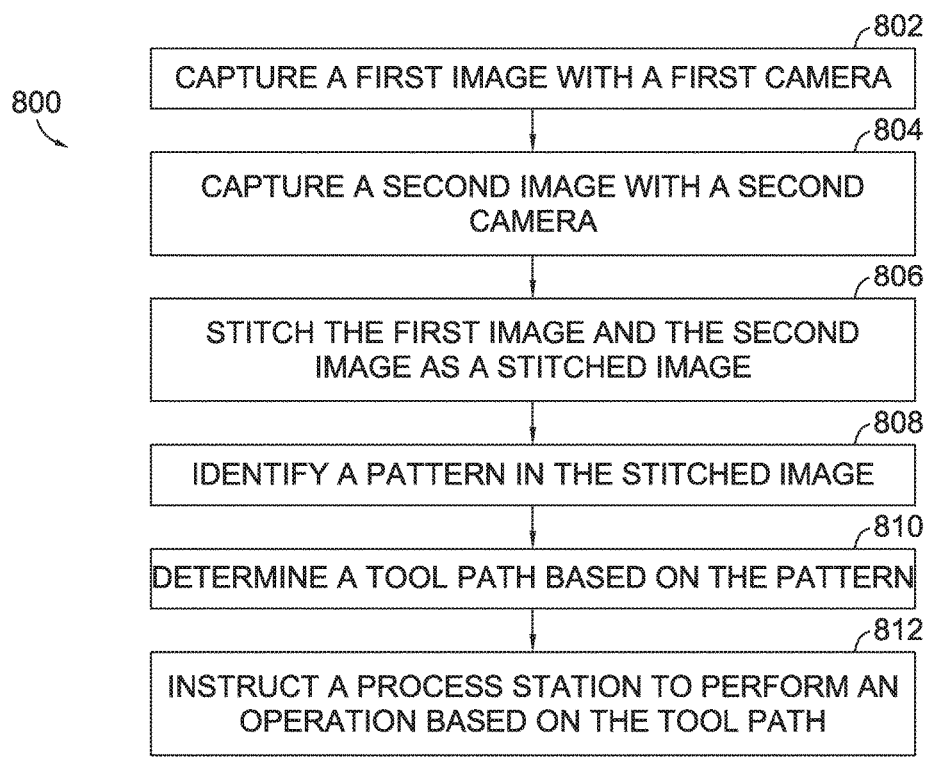
FIG. 8 depicts an exemplary block diagram representing a method for image stitching and manufacturing with a vision system, in accordance with aspects hereof.

FIG. 8 depicts an exemplary block diagram 800 representing a method for image stitching and manufacturing with a vision system, in accordance with aspects hereof. At a block 802 a first image is captured with a first camera. The first image may capture a first portion of a material, such as a rolled good. At a block 804, a second camera captures a second image. The second image may capture a second portion of the material. The first image and the second image may be captured simultaneously. Additionally, the first portion and the second portion include a common portion, in an exemplary aspect. The common portion is an overlap of the first image and the second image.

At a block 806 the first image and the second image are stitched together as a stitched image. The stitched image may subsequently be used as an input by one or more computing devices and/or process stations to generate a tool path for performing on the first and/or second portions of the material.

While only a first and second image with respective first and second cameras are provided in FIG. 8, it is contemplated that any number of images from different cameras (or a common camera) may be implemented in aspects hereof.

At a block 808, a first pattern is identified in the stitched image. The pattern may be a feature, a point of interest, a collection of points of interest, a marker, or other perceptible element captured in the stitched image. The pattern may be a feature of a shoe part or a feature effective to identify a shoe part, in an exemplary aspect. At a block 810, a tool path is determined based on the pattern. For example, the pattern identified in the stitched image may be associated with one or more tool paths stored in memory for a process station. The tool path may be numerical control instructions for causing a process station to perform an operation on the material. For example, the tool path may be a set of instructions for a laser cutter to cut the material based on the features identified in the stitched image, in an exemplary aspect.

At a block 812, a process station is instructed to perform an operation based on the tool path from the block 810. For example, a computing device in communication with the plurality of cameras and the process station may receive images from the cameras, stitch the images into a stitched image, identify a feature within the stitched image, determine a tool path associated with the identified feature, and communicate the tool path to the process station. After receiving the tool path, the process station may interpret the tool path as a series of instructions that allow the process station to perform the operation on the material, in an exemplary aspect. It is contemplated in an exemplary aspect that the processes station may be a laser cutting device that receives a tool path that is a series of instructions from a computing device to cut the material.

While FIG. 8 provides a series of steps in an illustrated order, it is contemplated that additional or fewer steps may be performed in exemplary aspects. For example, it is contemplated that four or more images may be captured from different cameras and the multiple images are then stitched together as a unitary image, in an exemplary aspect. However, more or fewer cameras and/or images may be implemented in the exemplary aspects.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

While specific elements and steps are discussed in connection to one another, it is understood that any element and/or steps provided herein is contemplated as being combinable with any other elements and/or steps regardless of explicit provision of the same while still being within the scope provided herein. Since many possible embodiments may be made of the disclosure without departing from the scope thereof, it is to be understood that all matter herein set forth or shown in the accompanying drawings is to be interpreted as illustrative and not in a limiting sense.

The invention claimed is:

1. An image stitching and manufacturing system, comprising:
   a conveyance system, the conveyance system moves a material in a process direction;
   a plurality of cameras, wherein a first camera of the plurality of cameras has a first field of view ("FOV")

including an area relative to the conveyance system that overlaps a portion of a second FOV of a second camera of the plurality of cameras;

a process station, wherein the process station is after the plurality of cameras in the process direction of the conveyance system; and a computing device, the computing device is logically coupled with the plurality of cameras to receive a first image from the first camera having the first FOV and a second image from the second camera having the second FOV, wherein the computing device stitches the first image and the second image to form a stitched image, the stitched image is an input for the computing device to provide instructions to the process station.

2. The image stitching and manufacturing system of claim 1, wherein the process station is a cutting device.

3. The image stitching and manufacturing system of claim 2, wherein the cutting device is comprised of a laser, the laser is functional to cut the material.

4. The image stitching and manufacturing system of claim 1, wherein the process station is selected from one of the following:
   a) an adhesive application device;
   b) a painting device;
   c) a pickup tool;
   d) a pressing device;
   e) a heating device;
   f) a sewing device; and
   g) a welding device.

5. The image stitching and manufacturing system of claim 1, wherein the plurality of cameras are logically coupled to each capture an individual image simultaneously.

6. The image stitching and manufacturing system of claim 1, wherein the plurality of cameras are positioned relative to the conveyance system to capture with a combination of FOV from the plurality of cameras a width of the conveyance system that is perpendicular to the process direction.

7. The image stitching and manufacturing system of claim 1, wherein a third camera of the plurality of cameras has a third FOV including an area relative to the conveyance system that overlaps a portion of a fourth FOV of a fourth camera of the plurality of cameras.

8. The image stitching and manufacturing system of claim 7, wherein the third FOV also overlaps a portion of the second FOV.

9. The image stitching and manufacturing system of claim 8, wherein the third FOV and the first FOV overlap discretely different portions of the second FOV.

10. The image stitching and manufacturing system of claim 1, wherein the conveyance system is comprised of a rolled material holder, the plurality of cameras are positioned between the rolled material holder and the process station.

11. The image stitching and manufacturing system of claim 1, further comprising a position register, wherein the position register registers a position of the material captured in the stitched image relative to the process station.

12. An image stitching and manufacturing method, the method comprising:
   capturing a first image with a first camera of a first material portion of a material;
   capturing a second image with a second camera of a second material portion of the material, wherein the first material portion and the second material portion include a first common portion of the material;
   stitching the first image and the second image as a stitched image;
   identifying a first pattern in the stitched image;
   determining a first tool path based on the identified first pattern;
   and
   instructing a process station to perform an operation on the material based on the first tool path.

13. The image stitching and manufacturing method of claim 12, wherein the first image and the second image are captured simultaneously.

14. The image stitching and manufacturing method of claim 12, wherein the operation is a cutting operation to remove a feature from at least one of the first material portion and the second material portion.

15. The image stitching and manufacturing method of claim 14, wherein the first tool path is a path useable by a laser cutter to cut the feature from the material.

16. The image stitching and manufacturing method of claim 12, wherein the stitched image is stitched based on the first common portion.

17. The image stitching and manufacturing method of claim 12, further comprising:
   capturing a third image with a third camera of a third material portion of the material; and
   capturing a fourth image with a fourth camera of a fourth material portion of the material,
   wherein the second material portion and the third material portion include a second common portion of the material,
   wherein the third material portion and the fourth material portion include a third common portion of the material.

18. The image stitching and manufacturing method of claim 17, wherein stitching the first image and the second image as the stitched image further comprises also stitching the third image and the fourth image as the stitched image.

19. The image stitching and manufacturing method of claim 12, further comprising registering the material position as it moves and instructing the process station to perform the operation based on the registered position of the material.

20. A calibration method of a vision system for using image stitching with a manufacturing process, the method comprising:
   calibrating a first camera having a first field of view ("FOV") from the vision system;
   calibrating a second camera having a second FOV from the vision system, wherein the first FOV and the second FOV include a common area;
   capturing a first image from the first camera;
   capturing a second image from the second camera;
   identifying a consensus feature in the first image and the second image;
   adjusting an offset of the first camera and the second camera based on the identified consensus feature;
   generating a first stitched image from the first camera and the second camera after adjusting the offset;
   calibrating the vision system based on the first stitched image;
   generating a second stitched image of a material after calibrating the vision system based on the first stitched image;
   identifying a pattern in the second stitched image;
   determining a tool path based on the identified pattern; and
   instructing a process station to perform an operation on the material based on the tool path.

* * * * *